(12) United States Patent
Yoo et al.

(10) Patent No.: US 9,401,665 B2
(45) Date of Patent: Jul. 26, 2016

(54) ELECTRIC POWER CONVERSION APPARATUS

(71) Applicants: LSIS CO., LTD., Anysang-si, Gyeonggi-do (KR); SNU R&DB FOUNDATION, Seoul (KR)

(72) Inventors: Anno Yoo, Seoul (KR); Jung Ik Ha, Seoul (KR); Ho Joon Shin, Gumi-si (KR); Kwon Yub Hyung, Seoul (KR)

(73) Assignees: SNU R&DB FOUNDATION, Seoul (KR); LSIS CO., LTD., Anyang-si (KR)

( * ) Notice: Subject to any disclaimer, the term of this patent is extended or adjusted under 35 U.S.C. 154(b) by 134 days.

(21) Appl. No.: 14/486,568

(22) Filed: Sep. 15, 2014

(65) Prior Publication Data

US 2015/0078049 A1 Mar. 19, 2015

(30) Foreign Application Priority Data

Sep. 17, 2013 (KR) ........................ 10-2013-0112038

(51) Int. Cl.
| | |
|---|---|
| *H02M 7/48* | (2007.01) |
| *H02M 7/5387* | (2007.01) |
| *H02M 1/00* | (2006.01) |
| *H02M 3/156* | (2006.01) |
| *H02J 3/38* | (2006.01) |

(52) U.S. Cl.
CPC ............ *H02M 7/53871* (2013.01); *H02M 7/48* (2013.01); *H02M 7/4807* (2013.01); *H02M 7/4826* (2013.01); *H02J 3/385* (2013.01); *H02M 3/156* (2013.01); *H02M 2001/007* (2013.01); *H02M 2001/0025* (2013.01); *H02M 2001/0048* (2013.01); *H02M 2001/0054* (2013.01); *Y02B 70/1491* (2013.01); *Y02E 10/58* (2013.01)

(58) Field of Classification Search
CPC ................... H02M 2001/007; H02M 7/4807; H02M 7/4826; H02M 2001/0054; H02M 7/48
See application file for complete search history.

(56) References Cited

U.S. PATENT DOCUMENTS

| | | | | |
|---|---|---|---|---|
| 5,329,222 | A * | 7/1994 | Gyugyi ................. | H02J 3/1814 307/102 |
| 8,674,668 | B2 * | 3/2014 | Chisenga .............. | H02M 3/156 323/266 |

(Continued)

OTHER PUBLICATIONS

English Translation of JP2005-006383, Tai Masa, System interconnection inverter apparatus and its controlling method,Jun. 1, 2005.*

*Primary Examiner* — Timothy J Dole
*Assistant Examiner* — Ishrat Jamali
(74) *Attorney, Agent, or Firm* — Lee, Hong, Degerman, Kang & Waimey; Jonathan Kang; Harry Lee (57) ABSTRACT

The disclosure relates to an electric power conversion apparatus, and capable of determining a minimum output voltage of a boost converter based on a voltage of the grid, and comparing the minimum output voltage of the converter with an input voltage of the converter, and controlling the operation of the converter based on the comparison result, thereby reducing the unnecessary operation and switching loss of the converter, the electric power conversion apparatus according to the invention comprises a converter; and a control unit configured to detect a grid voltage to determine a minimum output voltage of the converter based on the grid voltage, and control the operation of the converter based on an input voltage of the converter and the determined minimum output voltage.

8 Claims, 5 Drawing Sheets

(56) References Cited

U.S. PATENT DOCUMENTS

2009/0121549 A1* 5/2009 Leonard ............... H02M 3/156
 307/51

2012/0062044 A1* 3/2012 Wagoner ................. H02J 3/38
 307/151

2013/0027997 A1* 1/2013 Tan .......................... G05F 1/67
 363/95

* cited by examiner

ELECTRIC POWER CONVERSION APPARATUS

CROSS-REFERENCE TO RELATED APPLICATIONS

Pursuant to 35 U.S.C. §119(a), this application claims the benefit of earlier filing date and right of priority to Korean Application No. 10-2013-0112038, filed on Sep. 17, 2013, the contents of which are all hereby incorporated by reference herein in its entirety.

BACKGROUND OF THE INVENTION

1. Field of the Invention

The present disclosure relates to an electric power conversion apparatus, and more particularly, to the electric power conversion apparatus capable of determining a minimum output voltage of a boost converter for boosting a DC voltage to compare it with an input voltage of the converter, and controlling the operation of the converter based on the comparison result so as to reduce an unnecessary operation of the converter.

2. Description of the Related Art

The operation of a typical multi-string photovoltaic system is carried out by controlling a plurality of photovoltaic cell generators and converters connected thereto, respectively. The maximum power point tracking control of the generator should be always carried out to efficiently operate the multi-string photovoltaic system, and to this end, the converter is always controlled to output a constant high voltage.

Figure 1:
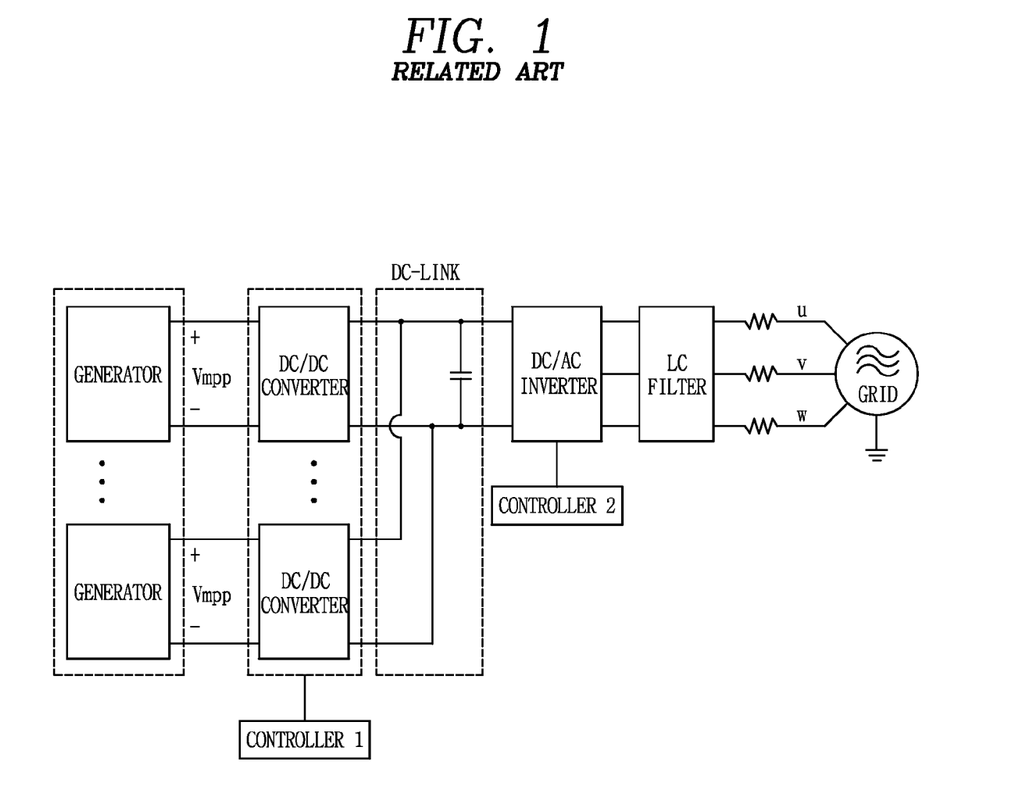
FIG. 1 is a configuration diagram illustrating the configuration of a multi-string photovoltaic system in the related art.

FIG. 1 is a configuration diagram illustrating a multi-string photovoltaic system in the related art.

As illustrated in FIG. 1, in a multi-string photovoltaic system, a plurality of generators (that is solar cells) connect with DC/DC boost converters, respectively, to form parallel circuits.

The plurality of converters are connected to a DC-link stage, and a DC/AC inverter and an LC filter are provided therein, and a final stage thereof is connected to a grid, thereby configuring an electric power generation system.

Controller 1 recognizes the output voltage or current of the generator and operates the DC/DC boost converter to perform maximum power point tracking control. A DC-link voltage should be set to a constant high voltage to transfer an electric power generated from the generator to a grid, and it is set by controller 2 controlling the inverter. The controller 2 always controls the DC-link voltage which is an input voltage of the inverter with a constant high value, and due to this, the DC/DC boost converter is always operated to output a constant high voltage.

In the related art, the DC/DC boost converter is operated all the time, thus causing the switching loss of the converter as well as leading to a non-optimized efficiency of the overall system efficiency due to unnecessary electric power conversion.

SUMMARY OF THE INVENTION

Accordingly, in order to solve the unnecessary operation and switching loss of a converter in the related art, that task of the present disclosure is to provide an electric power conversion apparatus capable of determining a minimum output voltage of a boost converter based on a voltage of the grid, and comparing the minimum output voltage of the converter with an input voltage of the converter, and controlling the operation of the converter based on the comparison result, thereby reducing the unnecessary operation and switching loss of the converter.

In order to accomplish the foregoing task, the electric power conversion apparatus according to the present disclosure, comprising:

a converter; and a control unit configured to detect a grid voltage so that the control unit determines a minimum output voltage of the converter based on the grid voltage, and control the operation of the converter based on an input voltage of the converter and the determined minimum output voltage.

According to one aspect of the present disclosure, the converter may be a DC/DC boost converter for boosting a DC voltage to a predetermined voltage.

According to another aspect of the present disclosure, the minimum output voltage of the converter is configured with a minimum voltage capable of delivering maximum electric power to the grid.

According to still another aspect of the present disclosure, the control unit is configured to compare a size of the input voltage of the converter with a size of the determined minimum output voltage to control the operation of the converter to be stopped when the input voltage of the converter is equal to or greater than the determined minimum output voltage.

According to still another aspect of the present disclosure, the electric power conversion apparatus may further comprise an inverter linked to an output stage of the converter.

According to still another aspect of the present disclosure, the inverter is configured with a DC/AC inverter linked to the grid to convert a DC voltage output from the converter into a commercial AC voltage that can be used in the grid.

According to still another aspect of the present disclosure, the electric power conversion apparatus may further comprises an LC filter between the inverter and the grid.

According to still another aspect of the present disclosure, the control unit comprises:

a first controller configured to detect an input voltage of the converter; and a second controller configured to detect an input/output voltage of the inverter.

According to still another aspect of the present disclosure, the first controller and the second controller are configured to transmit and receive voltage information detected therebetween.

According to still another aspect of the present disclosure, the first controller is configured to detect an input voltage of the converter so that the first controller compares the input voltage with the determined minimum output voltage information transmitted from the second controller, and controls the switching operation of the converter based on the comparison result, and the second controller is configured to detect a voltage of the grid so that the second controller determines a minimum output voltage of the converter based on the grid voltage and transmits the determined minimum output voltage information to the first controller.

According to still another aspect of the present disclosure, the first controller is configured to control the switch of the converter so that the switch is open so as to stop the operation of the converter when the input voltage of the converter is higher than the determined minimum output voltage.

According to still another aspect of the present disclosure, the first controller is configured to detect the input voltage of the converter so that the first controller transmits the input voltage information of the converter to the second controller; and the second controller is configured to detect a voltage of the grid so that the second controller determines a minimum output voltage of the converter based on the grid voltage, and compares the minimum output voltage with the input voltage information of the converter transmitted from the first controller, and controls the boosting operation of the converter based on the comparison result.

According to still another aspect of the present disclosure, when the input voltage of the converter is higher than the minimum output voltage, the second controller is configured to control the output voltage of the converter to be set to the same as the input voltage of the converter so as to stop the boosting operation of the converter.

According to still another aspect of the present disclosure, a plurality of converters linked to a plurality of generators, respectively, wherein the control unit is configured to detect input voltages of the plurality of converters, respectively, and control the operation of the converter to allow the highest voltage among input voltages of the plurality of converters and the determined minimum output voltage to be an output voltage of the converter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A technology disclosed in the present disclosure may be applicable to an electric power conversion apparatus, an electric power conversion system, and a method thereof. However, a technology disclosed in the present disclosure may not be necessarily limited to this, but also be applicable to all electric power conversion apparatus and system, a power generation system, and other new and renewable energy generation system. In particular, a new and renewable energy generation as eco-friendly generation may include photovoltaic generation, biomass power generation, small-hydro power generation, marine energy generation, waste-to-energy power generation, geothermal power, wind power, fuel cell power generation, for example.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Hereinafter, the embodiments disclosed herein will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

First, the configuration of an electric power conversion apparatus disclosed herein will be described with reference to FIG. 2.

Figure 2:
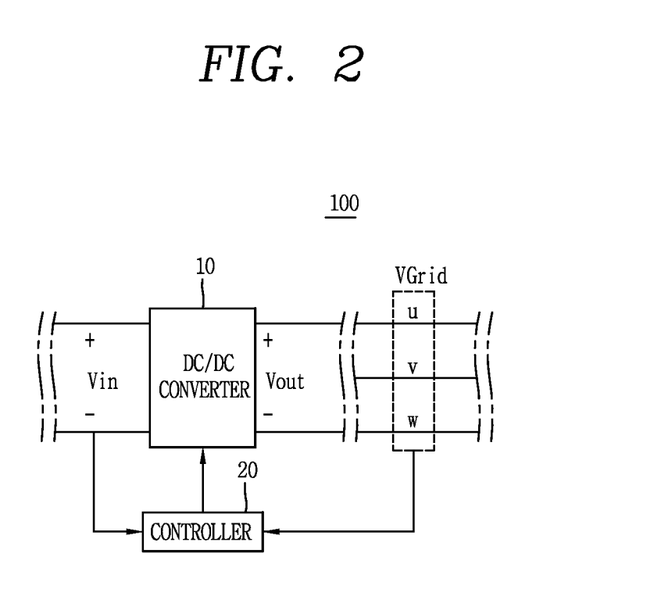
FIG. 2 is a configuration diagram illustrating a configuration of an electric power conversion apparatus according to a preferred embodiment of the present invention.

FIG. 2 is a configuration diagram illustrating a configuration of an electric power conversion apparatus according to a preferred embodiment of the present invention.

As illustrated in FIG. 2, the electric power conversion apparatus 100 comprises a converter 10 and a control unit 20 configured to detect a grid voltage so that the control unit 20 determines a minimum output voltage of the converter 10 based on the detected grid voltage, and controls the operation of the converter 10 based on an input voltage of the converter 10 and the determined minimum output voltage.

The electric power conversion apparatus 100 may be applicable to a generation system for generating electric power in the form of DC voltage.

For example, it may be applicable to a generation system such as a photovoltaic generation system in which its generated voltage is a DC voltage.

The photovoltaic generation system denotes a generation system for illuminating light on a solar cell with the principle of photovoltaic effect to generate electricity, wherein a plurality of photovoltaic modules modularized with the solar cells are connected to generate electricity in the form of DC voltage through a photovoltaic (can be abbreviated as PV hereinafter) array which is made to suit the application requirements.

The electric power conversion apparatus 100 may be provided at an output stage of the PV array, which is a generator of the photovoltaic generation system, to convert a DC voltage generated from the PV array into a type of voltage that can be supplied to another electric power conversion apparatus or a grid.

The converter 10 may be configured with a DC/DC boost converter for boosting a DC voltage to a predetermined voltage.

For example, when a DC voltage of 30 V is generated from the PV array, the converter 20 may boost the generated DC voltage of 30 V into 60 V.

The converter 10 may boost a DC voltage generated from the generator into a size of voltage that can be supplied to another electric power conversion apparatus or a grid.

For example, when electric power should be supplied to a battery at a voltage of 200 V, the converter 10 may boost a DC voltage generated from the generator to a size of 200 V, thereby delivering the electric power to the inverter at a voltage of 200 V.

The converter 10 may be configured with a DC/DC boost converter for boosting an input voltage by switching operation using semiconductors to output the boosted voltage.

The boost converter may stop the boosting operation when the switch is open, and perform the boosting operation when the switch is closed.

In other words, the output voltage is output with the same size as that of the input voltage when the switch is open, but the input DC voltage is boosted to output the boosted DC voltage when the switch is closed.

The minimum output voltage of the converter 10 may be a minimum voltage capable of delivering maximum electric power to the grid.

The minimum output voltage of the converter 10 may be determined based on a commercial AC voltage supplied to the grid.

For example, when the commercial AC voltage supplied to the grid is AC 220 V, the minimum output voltage of the converter 10 may be determined based on the supplied voltage, and a size of the minimum DC voltage that should be output by the converter 10 may be determined in addition to elements such as a size of current, an impedance, a DC/AC conversion and alternating current loss, and the like.

The minimum output voltage of the converter 10 may be determined based on a result in which the voltage of the grid has been detected.

For example, when a voltage supplied to the grid is not commercial AC 220 V, the minimum output voltage of the converter 10 may be determined based on a result in which the voltage of the grid has been detected to accurately determine a minimum DC voltage that should be output by the converter 10.

The control unit 20 can detect a size of the input voltage of the converter 10.

The size of a voltage input to the converter 10 may be varied according to the type and operation status of a generator linked to the converter 10.

For example, when the generator is a photovoltaic generator, the size of a DC voltage generated from the photovoltaic generator may be often varied due to the configuration of the PV array or the effect of weather.

The control unit 20 can compare a size of the input voltage of the converter 10 with a size of the determined minimum output voltage.

The control unit 20 can compare a size of the input voltage of the converter 10 with a size of the determined minimum output voltage, and control the operation of the converter 10 to be stopped when the input voltage of the converter 10 is equal to or greater than the determined minimum output voltage.

For example, when the input voltage of the converter 10 is DC 100 V and the determined minimum output voltage is DC 60 V, the input voltage of the converter 10 is equal to or greater than the determined minimum output voltage, and thus the control unit 20 controls the converter 10 to stop the operation of the converter 10.

Otherwise, when the input voltage of the converter 10 is equal to or less than the determined minimum output voltage, the control unit 20 may control the converter 10 to perform the operation of the converter 10.

For example, when the input voltage of the converter 10 is DC 60 V and the determined minimum output voltage is DC 100 V, the input voltage of the converter 10 is equal to or less than the determined minimum output voltage, and thus the control unit 20 controls the converter 10 to perform the operation of the converter 10.

Figure 3:
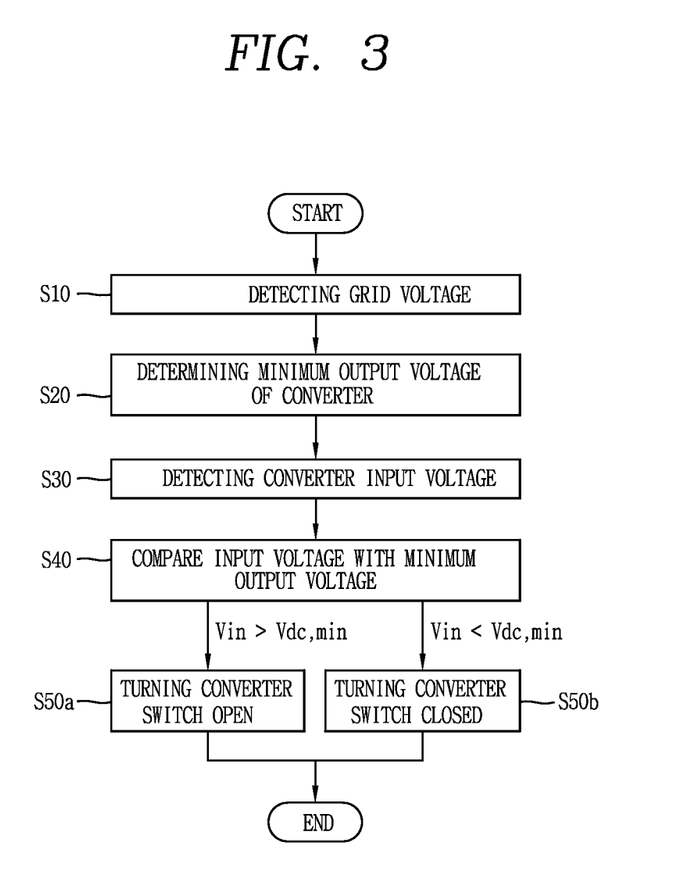
FIG. 3 is a flow chart illustrating an electric power conversion control process of the electric power conversion apparatus disclosed in the present invention.

The power conversion control process of the electric power conversion apparatus 100 will be described for each step.

FIG. 3 is a flow chart illustrating an electric power conversion control process of the electric power conversion apparatus disclosed according to the present invention.

As illustrated in FIG. 3, the power conversion control process of the electric power conversion apparatus may include detecting a grid voltage (S10), determining a minimum output voltage of the converter (S20), detecting an input voltage of the converter (S30), comparing an input voltage of the converter with the minimum output voltage of the converter (S40), and controlling the switch of the converter (S50a, S50b).

During the step (S10) of detecting a grid voltage, the commercial AC voltage of the grid may be detected.

During the step (S20) of detecting a minimum output voltage of the converter, the minimum output voltage that should be output by the converter may be determined based on the detected commercial AC voltage of the grid.

During the step (S30) of detecting an input voltage of the converter, a size of the voltage input to the converter from the generator can be detected.

During the step (S40) of comparing an input voltage of the converter with the minimum output voltage of the converter, the minimum output voltage determined during the step (S20) of determining the minimum output voltage of the converter may be compared with the input voltage of the converter detected during the step (S30) of detecting the input voltage of the converter.

During the step (S50a, S50b) of controlling the switch of the converter, the switch of the converter may be controlled based on a result in which the input voltage of the converter is compared with the minimum output voltage of the converter during the step (S40) of comparing an input voltage of the converter with the minimum output voltage of the converter.

The step of controlling the switch of the converter may be divided into the step (S50a) of opening the switch of the converter and the step (S50b) of closing the switch of the converter, wherein the switch of the converter may be open (S50a) when the input voltage of the converter is higher than the minimum output voltage of the converter as a result of comparing the input voltage of the converter with the minimum output voltage of the converter during the step (S40) of comparing an input voltage of the converter with the minimum output voltage of the converter, and the switch of the converter may be closed (S50b) when the input voltage of the converter is lower than the minimum output voltage of the converter as a result of comparing the input voltage of the converter with the minimum output voltage of the converter during the step (S40) of comparing an input voltage of the converter with the minimum output voltage of the converter.

The foregoing power control conversion process may be applicable to the control process of the electric power conversion apparatus, and also applicable to other electric power conversion apparatuses and systems.

Hereinafter, a preferred embodiment of the electric power conversion apparatus 100 disclosed in the present disclosure will be described with reference to FIG. 4.

Figure 4:
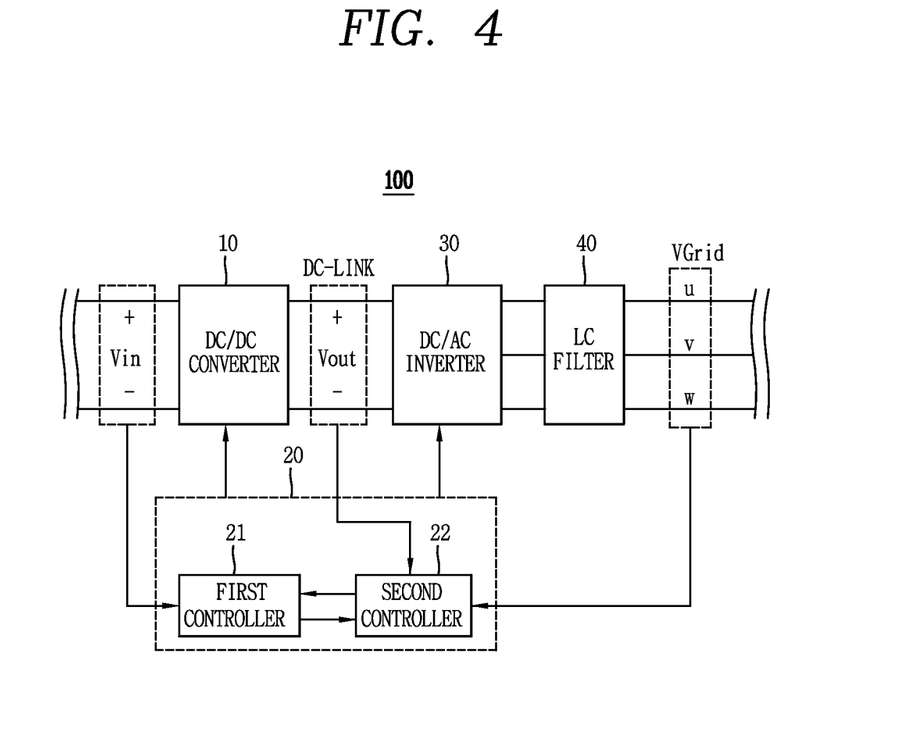
FIG. 4 is a configuration diagram showing a detailed configuration of the electric power conversion apparatus according to a preferred embodiment of the present invention.

FIG. 4 is a configuration diagram showing a detailed configuration of the electric power conversion apparatus according to a preferred embodiment of the present invention.

As illustrated in FIG. 4, the electric power conversion apparatus 100 comprises a converter 10 and a control unit 20 configured to detect a grid voltage to determine a minimum output voltage of the converter 10 based on the grid voltage, and control the operation of the converter 10 based on an input voltage of the converter 10 and the determined minimum output voltage, and may further comprise an inverter 30 linked to an output stage of the converter 10.

Here, the inverter 30 denotes an electric power conversion apparatus for converting a DC voltage into the form of AC voltage.

The inverter 30 may be a DC/AC (that is DC to AC) inverter linked to the grid to convert a DC voltage output from the converter 10 into a AC voltage that can be used in the grid.

The inverter 30 may be a 3-phasess inverter for converting a single phase DC voltage output from the converter 10 into a 3-phasess AC voltage that can be used in the grid.

The inverter 30 may be a grid linked inverter that is linked to the grid to be operated, or an independent inverter that can be independently operated.

A single phase DC voltage output from the converter 10 may be converted into the form of 3-phases AC voltage that can be used in the grid by linking the inverter 30 to an output stage of the converter 10.

For example, as illustrated in FIG. 3, a single phase voltage entered to the converter 10 may be converted into 3-phases (such as R-phase, S-phase, T-phase) AC voltages supplied to the grid through the inverter 30.

The inverter 30 may convert a size of the single phase DC voltage output from the converter 10 into a size of commercial voltage that can be used in the grid.

For example, when a size of commercial voltage that can be used in the grid is AC 220 V, the inverter 30 may convert a DC voltage input from the converter 10 into the size of AC 220 V, which is a size of commercial voltage that can be used in the grid to output the converted voltage.

Furthermore, the electric power conversion apparatus 100 may further comprise an LC filter 40 between the inverter 30 and the grid.

Here, the LC filter 40 denotes a filter for removing components other than a specific frequency, and may be a filter for removing harmonics contained in a 3-phases AC voltage converted from the inverter 30 and supplied to the grid.

The LC filter 40 is provided between the inverter 30 and the grid, thereby supplying a 3-phases AC voltage converted from the inverter 30 to the grid in a stable state in which the harmonics are removed.

The control unit 20 included in the electric power conversion apparatus 100 may include a first controller 21 configured to detect an input voltage of the converter 10 and a second controller 22 configured to detect an input/output voltage of the inverter 30.

The first controller 21 may detect an input voltage of the converter 10 and control the converter 10.

The second controller 22 may detect an input voltage and an output voltage (abbreviated as input/output voltage hereinafter) of the inverter 30 and control the inverter 30.

The input voltage of the inverter 30 may be the same as the output voltage of the converter 10, and the output voltage of the inverter 30 may be the same as a voltage supplied to the grid.

In other words, the output voltage of the converter 10 and the voltage of the grid may be detected by the second controller 22.

The first controller 21 and the second controller 22 can transmit and receive the voltage information detected therebetween.

For example, the input voltage information of the converter 10 detected by the first controller 21 may be transmitted to the second controller 22, and the information of grid voltage detected by the second controller 22 may be transmitted to the first controller 21.

The first controller 21 and the second controller 22 may be configured in a separated manner, respectively, or may be included in the converter 10 or the inverter 30, respectively.

Otherwise, the first controller 21 and the second controller 22 may be included in a single module.

Otherwise, the first controller 21 and the second controller 22 may be included in a control console separately provided at the outside of the electric power conversion apparatus 100.

Hereinafter, the power conversion control of the electric power conversion apparatus 100 according to an embodiment disclosed in the present disclosure will be described.

Embodiment 1

Switching Control of Converter

Embodiment 1 disclosed in the present disclosure may be implemented by any part or combination of the configuration or process included in the foregoing embodiments or implemented by a combination of the embodiments, and technological terms used herein are merely used to describe a specific embodiment, but not to limit the present invention.

The electric power conversion apparatus 100 comprises a converter 10, and a control unit 20 configured to detect a grid voltage so that the control unit 20 determines a minimum output voltage of the converter 10 based on the grid voltage, and control the operation of the converter 10 based on an input voltage of the converter and the determined minimum output voltage, and may further comprise an inverter 30 linked to an output stage of the converter 10 and an LC filter 40 linked between the inverter 30 and the grid.

And the controller contained in the electric power conversion apparatus 100 may include a first controller 21 configured to detect an input voltage of the converter 10 and a second controller 22 configured to detect an input/output voltage of the inverter 30, and the first controller 21 may detect an input voltage of the converter 10 to compare it with the determined minimum output voltage information transmitted from the second controller 22, and control the switching operation of the converter 100 based on the comparison result, and the second controller 22 may detect a voltage of the grid to determine a minimum output voltage of the converter 10 based on the grid voltage and transmit the determined minimum output voltage information to the first controller 21.

The first controller 21 may compare an input voltage of the converter detected from an input stage of the converter 10 with the determined minimum output voltage received from the second controller 22, and control the switch of the converter to be open so as to stop the operation of the converter 10 when the input voltage of the converter 10 is higher than the determined minimum output voltage as a result of the comparison.

The first controller 21 may control the switch of the converter 10 to be open to stop the boost operation of the converter 10, and converter 10 may output an output voltage having the same size as that of the input voltage of the converter 10.

The output voltage of the converter 10 may be an input voltage of the inverter 30, and converted into a 3-phases AC commercial voltage that can be used in the grid through the inverter 30.

In other words, when the input voltage of the converter 10 is greater than the determined minimum output voltage, the boost operation of the converter 10 is not required so that the first controller 21 control the switching operation of the converter 10 to be stopped. Accordingly, the output voltage of the converter 10 is output with the same size as that of the input voltage of the converter 10, and the output voltage of the converter 10 is converted into a 3-phases AC voltage through the inverter 30, and the converted 3-phases AC voltage may be supplied to the grid in a state that the harmonics are removed through the LC filter 40.

Furthermore, the first controller 21 may compare the input voltage of the converter detected from an input stage of the converter 10 with the determined minimum output voltage information received from the second controller 22, when the input voltage of the converter 10 is lower than the determined minimum output voltage, the first controller 21 can control the switch of the converter 10 to be closed to perform the operation of the converter 10.

In other words, when the input voltage of the converter 10 is lower than the determined minimum output voltage, the boost operation of the converter 10 is not required so that the first controller 21 controls the switching operation of the converter 10 to be carried out. Accordingly, the output voltage of the converter 10 is boosted and output, and the output voltage of the converter 10 is converted into a 3-phases AC commercial voltage through the inverter 30, and the converted 3-phases AC commercial voltage may be supplied to the grid in a state that the harmonics are removed through the LC filter 40.

Embodiment 2

Boosting Operation Control of Converter

Embodiment 2 disclosed in the present disclosure may be implemented by any part or combination of the configuration or process included in the foregoing embodiments or implemented by a combination of the embodiments, and technological terms used herein are merely used to describe a specific embodiment, but not to limit the present invention.

The electric power conversion apparatus 100 comprises a converter 10, and a control unit 20 configured to detect a grid voltage to determine a minimum output voltage of the converter 10 based on the grid voltage, and control the operation of the converter 10 based on an input voltage of the converter and the determined minimum output voltage. The electric power conversion apparatus 100 may further comprise an inverter 30 linked to an output stage of the converter 10 and an LC filter 40 linked between the inverter 30 and the grid. And the control unit 20 contained in the electric power conversion apparatus 100 may include a first controller 21 configured to detect an input voltage of the converter 10 and a second controller 22 configured to detect an input/output voltage of the inverter 30. The first controller 21 may detect an input voltage of the converter 10 to transmit the input voltage information of the converter 10 to the second controller 22, and the second controller 22 may detect a voltage of the grid to determine a minimum output voltage of the converter based on the detected grid voltage so as to compare it with the input voltage information of the converter 10 transmitted from the first controller 21, and control the boosting operation of the converter 10 based on the comparison result.

Here, the output voltage of the converter 10 may have the same meaning as the input voltage of the inverter 30.

Here, the boosting operation may denote an operation in which the making voltage up operation of the converter 10 is carried out, and can mean a switching operation of the converter 10, an closing or opening of capacitor contained in the converter 10, opening or closing of the external switching of the converter 10, and the like, for example.

Otherwise, it may be the control operation of an internal module in which the output voltage of the converter 10 is set to be output as a predetermined voltage, and the set predetermined voltage is automatically recognized during the output thereof to control the boosting operation of the converter 10 to be stopped.

In other words, when the output voltage of the converter 10 is output as the set predetermined voltage, the converter 10 may stop the boosting operation.

The second controller 22 may compare the input voltage information of the converter 10 detected from an input stage of the converter 10 received from the first controller 21 with the determined minimum output voltage based on the detected voltage of the grid, and control the output voltage of the converter 10 to be set to the same as that of the input voltage of the converter 10 so as to stop the boosting operation of the converter 10 when the input voltage of the converter 10 is higher than the determined minimum output voltage as a result of the comparison.

The second controller 22 may set the output voltage of the converter 10 to be same as the input voltage of the converter 10 to stop the boosting operation of the converter 10, and the converter 10 may output an output voltage having the same size as that of the input voltage of the converter 10.

The output voltage of the converter 10 may be an input voltage of the inverter 30, and converted into a 3-phases AC commercial voltage that can be used in the grid through the inverter 30.

In other words, when the input voltage of the converter 10 is greater than the determined minimum output voltage, the boost operation of the converter 10 is not required so that the second controller 22 control the switching operation of the converter 10 to be stopped. Accordingly, the output voltage of the converter 10 is same as the input voltage of the converter 10, and the output voltage of the converter 10 is converted into a 3-phases AC commercial voltage through the inverter 30, and the converted 3-phases AC commercial voltage may be supplied to the grid in a state that the harmonics are removed through the LC filter 40.

Furthermore, the second controller 22 may compare the input voltage information of the converter 10 detected from an input stage of the converter 10 received from the first controller 21 with the determined minimum output voltage based on the detected voltage of the grid, and control the output voltage of the converter 10 to be set to be equal to or greater than the determined minimum output voltage so as to perform the boosting operation of the converter 10 when the input voltage of the converter 10 is lower than the determined minimum output voltage as a result of the comparison.

In other words, when the input voltage of the converter 10 is lower than the determined minimum output voltage, the boost operation of the converter 10 is required so that the second controller 22 controls the boosting operation of the converter 10 to be carried out. Accordingly, the output voltage of the converter 10 is boosted and output, and the output voltage of the converter 10 is converted into a 3-phases AC commercial voltage through the inverter 30, and the converted 3-phases AC commercial voltage may be supplied to the grid in a state that the harmonics are removed through the LC filter 40.

Hereinafter, a specific embodiment of the electric power conversion apparatus 100 disclosed in the present disclosure will be described with reference to FIG. 5.

Figure 5:
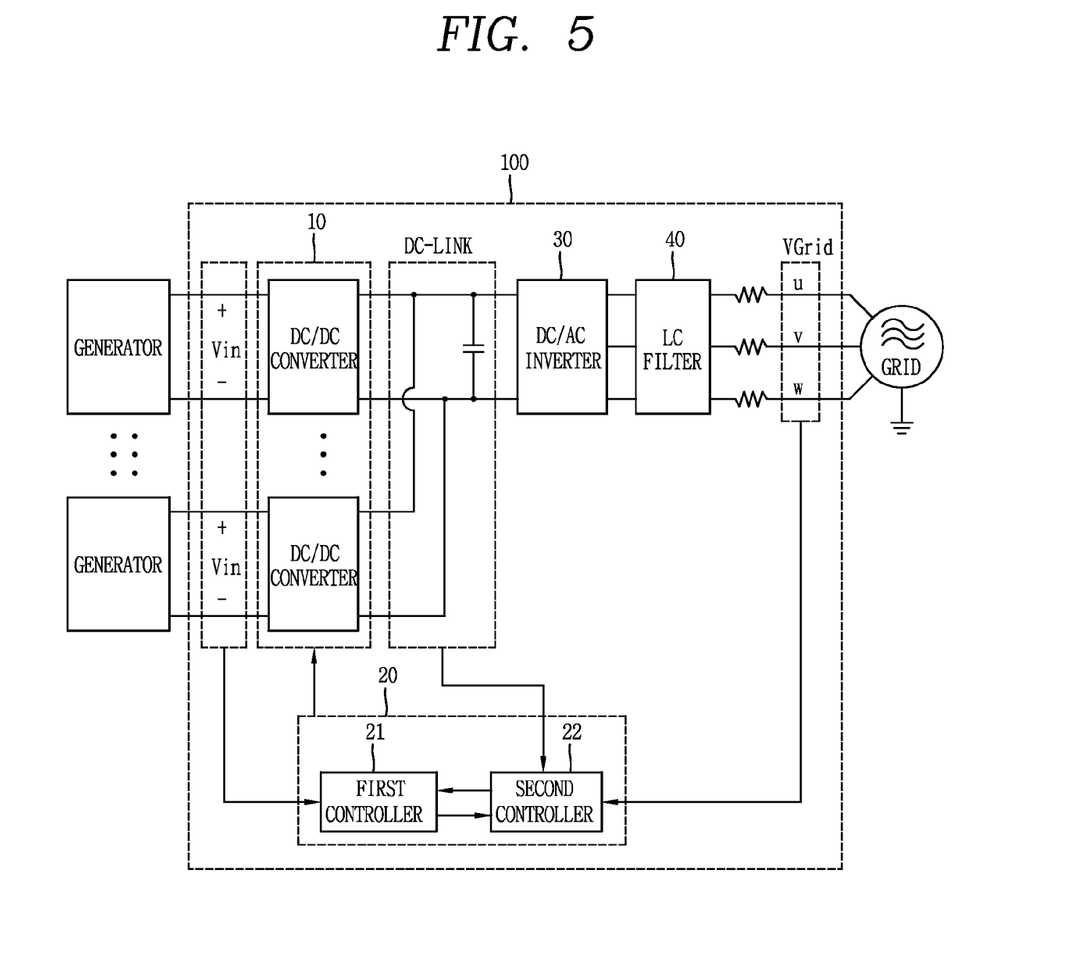
FIG. 5 is a configuration diagram showing a detailed configuration of the electric power conversion apparatus according to another preferred embodiment of the present invention.

FIG. 5 is a configuration diagram showing a detailed configuration of the electric power conversion apparatus according to another preferred embodiment of the present invention.

The electric power conversion apparatus 100, as illustrated in FIG. 5, comprises a plurality of converters 10, linked to a plurality of generators, respectively, and a control unit 20 configured to detect a grid voltage to determine a minimum output voltage of the plurality of converters 10 based on the detected grid voltage, and control the operation of the plurality of converters 10 based on an input voltage of the plurality of converters and the determined minimum output voltage, And the electric power conversion apparatus 100 may further comprise an inverter 30 linked commonly to an output stage of the plurality of converters 10 and an LC filter 40 linked between the inverter 30 and the grid. The control unit 20 may include a first controller 21 configured to detect an input voltage of the plurality of converters 10 and a second controller 22 configured to detect an input/output voltage of the inverter 30. And the control unit 20 detect each input voltage of the plurality of converters 10 to control the operation of the converter 10 so that the highest voltage among each input voltage of the plurality of converters 10 and the determined minimum output voltage can be the output voltage of the converter 10.

The first controller 21 may detect each input voltage of the plurality of converters 10 and control the plurality of converters 10, respectively.

The second controller 22 may detect the voltage of a DC LINK unit linked commonly to an output stage of the plurality of converters 10, respectively, and also set up an input voltage of the inverter 30, namely, set up a reference voltage of the DC LINK unit linked commonly to an output stage of the plurality of converters 10, respectively.

The reference voltage may be determined on the basis of each input voltage of the plurality of converters 10 and the determined minimum output voltage.

The reference voltage may be a minimum input voltage of the inverter 30 required for the inverter 30 to convert it to a commercial voltage that can be used in the grid.

In other words, the reference voltage is determined to be at least equal to or larger than the determined minimum output voltage.

The plurality of converters 10 may be controlled by the control unit 20 based on each input voltage of the plurality of converters 10 and the determined minimum output voltage determined from the first controller 21 and the second controller 22.

For example, when the input voltage of converter A is 30 V, and the input voltage of converter B is 50 V, and the determined minimum output voltage is 40 V, the control unit 20 detects and compares them with one another, and controls the plurality of converters 10 so that the input voltage 50 V of the converter B having the highest size of voltage can be the output voltage of the plurality of converters 10, and thus the converter A and the converter B output the voltage of 50 V, and in this case, the control unit 20 controls the converter A to perform a switching operation and controls the converter B to stop a switching operation.

In other words, the control unit 20 may control a converter that requires the boosting operation to perform a switching operation, and controls a converter that does not requires the boosting operation to stop a switching operation.

The embodiments of the electric power conversion apparatus disclosed in the present disclosure may be implemented to be applicable to a grid control apparatus, and a system thereof.

The embodiments of the electric power conversion apparatus disclosed in the present disclosure may be implemented to be applicable to the electric power conversion apparatus including a DC/DC converter and an inverter, and a system thereof.

The embodiments of the electric power conversion apparatus disclosed in the present disclosure may be implemented to be applicable to a new and renewable energy generation system.

The embodiments of the electric power conversion apparatus disclosed in the present disclosure may be implemented to be applicable to a generation facility management apparatus linked to a plurality of generation facilities to control them in an integrated or individual manner, and a system thereof.

The embodiments of the electric power conversion apparatus disclosed in the present disclosure may be implemented to be applicable to a multi-string photovoltaic system, particularly, having a plurality of PV arrays.

The embodiments of the electric power conversion apparatus disclosed in the present disclosure may be implemented to be applicable to a software method programmed with a power conversion control process, and also implemented with one or more combinations of the embodiments, respectively.

The embodiments of the electric power conversion apparatus disclosed in the present disclosure may be implemented to be applicable to response time measurement for a fire facility related to safety management, and a system thereof.

The embodiments of the electric power conversion apparatus disclosed in the present disclosure may be implemented to be applicable to all power facilities and systems, private or emergency power systems used for residential, building, public facility, commercial and industrial use.

A electric power conversion apparatus disclosed herein may compare a minimum output voltage of the converter with an input voltage of the converter, and control the operation of the converter based on the comparison result to prevent the unnecessary operation of the converter, thereby increasing the electrical and mechanical lifespan of the converter.

Furthermore, the electric power conversion apparatus disclosed herein may prevent the unnecessary operation of the converter to obtain the effect of reducing the switching loss of the converter, thereby increasing the efficiency of the electric power conversion apparatus and the overall system.

In addition, the electric power conversion apparatus disclosed herein may detect a parameter, which is an operating condition of the converter, to control the converter based on the parameter, thereby obtaining the effect of allowing the flexible control and operation of the electric power conversion apparatus as well as allowing various applications and flexible system managements for a system management system due to a broad range of applications.

The foregoing preferred embodiments of the present disclosure are disclosed to solve technical tasks, and it will be apparent to those skilled in this art that various modifications, variations and additions can be made thereto without departing from the spirit and scope of the present invention. Those modification and the like should be construed to be included in the following claims.

What is claimed is:

1. An electric power conversion apparatus, comprising:
a converter;
a control unit configured to detect a grid voltage so that the control unit determines a minimum output voltage of the converter based on the grid voltage, and control the operation of the converter based on an input voltage of the converter and the determined minimum output voltage;
an inverter linked to an output stage of the converter; and
an LC filter between the inverter and a grid,
wherein the inverter is configured with a DC/AC inverter linked to the grid to convert a DC voltage output from the converter into a commercial AC voltage that can be used in the grid,
wherein the control unit comprises:
a first controller configured to detect an input voltage of the converter; and
a second controller configured to detect an input/output voltage of the inverter,
wherein the first controller and the second controller are further configured to transmit and receive voltage information detected therebetween,
wherein the first controller is further configured to detect an input voltage of the converter so that the first controller compares the input voltage with the determined minimum output voltage information transmitted from the second controller, and controls the switching operation of the converter based on the comparison result, and
the second controller is further configured to detect a voltage of the grid so that the second controller determines a minimum output voltage of the converter based on the grid voltage and transmits the determined minimum output voltage information to the first controller.

2. The electric power conversion apparatus of claim 1, wherein the converter comprises a DC/DC boost converter for boosting the DC voltage to a predetermined voltage.

3. The electric power conversion apparatus of claim 1, wherein the minimum output voltage of the converter is configured with a minimum voltage capable of delivering maximum electric power to the grid.

4. The electric power conversion apparatus of claim 1, wherein the control unit is further configured to compare a size of the input voltage of the converter with a size of the determined minimum output voltage to control the operation of the converter to be stopped when the input voltage of the converter is equal to or greater than the determined minimum output voltage.

5. The electric power conversion apparatus of claim 1, wherein the first controller is further configured to control the switch of the converter so that the switch is open so as to stop the operation of the converter when the input voltage of the converter is higher than the determined minimum output voltage.

6. The electric power conversion apparatus of claim 1, further comprising:
a plurality of converters linked to a plurality of generators, respectively,
wherein the control unit is further configured to detect input voltages of the plurality of converters, respectively, and control the operation of the converter so that the highest voltage among input voltages of the plurality of converters and the determined minimum output voltage to be an output voltage of the converter.

7. An electric power conversion apparatus, comprising:
a converter;
a control unit configured to detect a grid voltage so that the control unit determines a minimum output voltage of the converter based on the grid voltage, and control the operation of the converter based on an input voltage of the converter and the determined minimum output voltage;
an inverter linked to an output stage of the converter; and
an LC filter between the inverter and a grid,
wherein the inverter is configured with a DC/AC inverter linked to the grid to convert a DC voltage output from the converter into a commercial AC voltage that can be used in the grid,
wherein the control unit comprises:
a first controller configured to detect an input voltage of the converter; and
a second controller configured to detect an input/output voltage of the inverter,
wherein the first controller and the second controller are further configured to transmit and receive voltage information detected therebetween,
wherein the first controller is further configured to detect the input voltage of the converter so that the first controller transmits the input voltage information of the converter to the second controller, and
wherein the second controller is further configured to detect a voltage of the grid so that the second controller determines a minimum output voltage of the converter based on the grid voltage, and compares the minimum output voltage with the input voltage information of the converter transmitted from the first controller, and controls the boosting operation of the converter based on the comparison result.

8. The electric power conversion apparatus of claim 7, wherein when the input voltage of the converter is higher than the minimum output voltage, the second controller is further configured to control the output voltage of the converter to be set to the same as the input voltage of the converter so as to stop the boosting operation of the converter.

* * * * *